United States Patent [19]

Magar et al.

[11] Patent Number: 5,029,079
[45] Date of Patent: Jul. 2, 1991

[54] APPARATUS AND METHOD FOR FLEXIBLE CONTROL OF DIGITAL SIGNAL PROCESSING DEVICES

[75] Inventors: Surendar S. Magar; Gerry C. Lui Kuo; Raul A. Aguilar; Michael E. Fleming, all of Colorado Springs, Colo.

[73] Assignee: Array Microsystems, Inc., Colorado Springs, Colo.

[21] Appl. No.: 228,611

[22] Filed: Aug. 4, 1988

[51] Int. Cl.[5] .................. G06F 15/332; G06F 7/544; G06F 13/16

[52] U.S. Cl. .................................. 364/200; 364/726; 364/736; 364/224; 364/243; 364/245.7; 364/271.5; 364/274.1; 364/281.6

[58] Field of Search ............... 364/200, 900, 726, 736

[56] References Cited

U.S. PATENT DOCUMENTS

| 4,241,411 | 12/1980 | Krasner et al. | 364/726 |
|---|---|---|---|
| 4,393,468 | 7/1983 | New | 364/736 |
| 4,689,762 | 8/1987 | Thibodeau, Jr. | 364/726 |
| 4,742,534 | 5/1988 | Verbeek et al. | 375/89 |
| 4,825,399 | 4/1989 | Nagai | 364/726 |

OTHER PUBLICATIONS

David Quong and Robert Perlman, *Electronic Design*, vol. 32, Jul., 1984, No. 14, "One-Chip Sequencer Shapes up Addressing For Large FFTs", pp. 159-164, 166, 168.

Allen M. Peterson and S. Shankar Narayan, *Wescon Conference Record*, vol. 25 (1981) Sep., "Fast Fourier Transfor (FFT) and Prime Factor Transform (PFT) Implementations for Signal Processing and Digital Filtering", pp. 1-8.

Zoran Data Sheet for ZR34161 Vector Signal Processor, Jul. 30, 1986, pp. 7-18.
Supplemental Data Sheet for Zoran Data Sheet for 2R 34161 Vector Signal Processor, pp. 20-26.

*Primary Examiner*—Thomas C. Lee
*Assistant Examiner*—Robert B. Harrell
*Attorney, Agent, or Firm*—Sheridan, Ross & McIntosh

[57] ABSTRACT

A control apparatus for use with a digital signal processing device and associated memory units is described. The control apparatus determines, along with the electrical configuration of the digital signal processing device and associated memory units, the application of members of a signal array to be processed and the removal of the members of a processed signal array from the digital signal processing device. The control apparatus controls the location of data exchanged between the digital signal processing device and the associated memory units. The control apparatus permits the digital signal processing device and associated memory units to operate in a normal mode where a predetermined processing operation is performed on the members of a signal array, a recursive mode where a series of operations are performed on a signal array by a single digital signal processing unit, and a sequential mode where a series of processing operations are performed on a signal array using a by plurality of digital signal processing units coupled in a series arrangement. The control apparatus has provision for automatic accommodation of predetermined latency in the signal member path, resulting from pipelined computation and from pipelined memory accesses, as well as accommodating preselected signal array sizes and preselected signal array overlap.

20 Claims, 11 Drawing Sheets

APPARATUS AND METHOD FOR FLEXIBLE CONTROL OF DIGITAL SIGNAL PROCESSING DEVICES

CROSS-REFERENCE TO RELATED APPLICATION

This application is related to the following U.S. Patent Application.

A HIGH-PERFORMANCE VECTOR ARRAY SIGNAL PROCESSOR invented by Surendar S. Magar, Michael E. Fleming, Shannon N. Shen, Kevin M. Rishavy, Christopher D. Furman and Kenneth N. Murphy; having Ser. No. 07/155,671; filed on Feb. 16, 1988 and assigned to the assignee of the present U.S. Patent Application.

BACKGROUND OF THE INVENTION

1. Field of the Invention

This invention relates generally to the digital processing of signal arrays and more particularly to the control of digital signal processing devices. By appropriate control of the associated digital signal processing apparatus, flexibility and enhanced processing of the signal arrays can be achieved.

2. Description of the Related Art

In the related art, the digital processing of signal arrays employing complex algorithms, such as the fast Fourier transform, has been performed generally using two techniques. In the first technique, the digital signal processing equipment has been a general purpose digital processing unit operating under the control of an appropriate software program. This processing technique is relatively slow and compromises the frequent requirement that the signal processing be performed in real time. The second technique involves the coupling of components in an appropriate manner to perform the requisite processing function. The use of component implementation of the apparatus requires relatively lengthy signal paths and can result in processing that can be unacceptably slow.

Recently, a device fabricated on a single semiconductor substrate has been developed that permits the execution of the processing operations that implement a radix-4 fast Fourier transform algorithm and a mixed radix-4/radix-2 fast Fourier transform algorithm. Because these algorithms permit rapid execution of the fast Fourier transform computations, the ability to process high frequency digital signals in real time is now possible. However, because of the great variability in the processing tasks, e.g., the number of members in an array to be processed, the control functions could not easily be included in components fabricated on the processor semiconductor substrate.

SUMMARY OF THE INVENTION

It is an object of the present invention to provide an improved apparatus for processing arrays of digital signals.

It is a feature of the present invention to provide a control apparatus for controlling the processing of digital signal arrays.

It is another feature of the present invention to provide a control apparatus for controlling the processing of digital signal arrays in which a plurality of address generator units can have their address signals applied to a plurality of associated memory units.

It is yet another feature of the present invention to provide a digital signal processing system that can execute digital processing procedures in a recursive manner.

It is a further feature of the present invention to provide a digital signal processing system that can execute processing procedures on signal arrays alone or as a member of a sequence of signal processing units.

It is yet a further feature of the present invention to easily accommodate changes in the digital signal processing system latency.

It is still another feature of the present invention to provide an improved system for performing a radix-4 fast Fourier transform on an array of signal groups.

It is still a further feature of the present invention to provide a digital signal processing system that can accommodate overlap of signal group arrays being processed.

The aforementioned and other features are accomplished, according to the present invention, by a control apparatus that can control the processing of an array of signals by a dedicated digital signal processing device and associated memory units.

The control apparatus executes an instruction sequence previously entered in the control apparatus by a microprocessor and/or a dedicated memory device. Each instruction includes a field that is used to determine the configuration of the associated digital signal processing device and the configuration of the associated memory system, therefore controlling the implementation of the algorithm being executed. Each instruction identifies a memory unit in which a signal array to be processed by the associated digital signal processing device is stored, initiates operation of an address sequencing apparatus for the memory array in which the signal array to be processed is stored, and initiates operation of an address sequencing apparatus for the memory array into which the processed signal array is to be stored. By controlling the memory array to which the signal array addresses are directed, the function of the memory array can be controlled. In this manner, a single, appropriately configured, digital signal processing device, in conjunction with the control apparatus of the present invention, can execute a multistep program implements, for example, a radix-4 fast Fourier transform algorithm. When selected control signals are exchanged between a plurality of digital signal processing systems using the control device, the systems can be coupled in a sequential or cascaded manner to expedite signal array processing. The control apparatus includes the ability to access coupled digital signal processing systems to control the flow of signals being processed among the data processing systems. This control permits simultaneous processing of a plurality of data arrays. The control apparatus also includes registers that store information relating to array size, latency and overlap size among data groups and that permit flexibility in handling of signal array processing.

These and other features of the invention will be understood upon reading of the following description along with the drawings.

DESCRIPTION OF THE PREFERRED EMBODIMENT

1. Detailed Description of the Figures

Figure 1A:
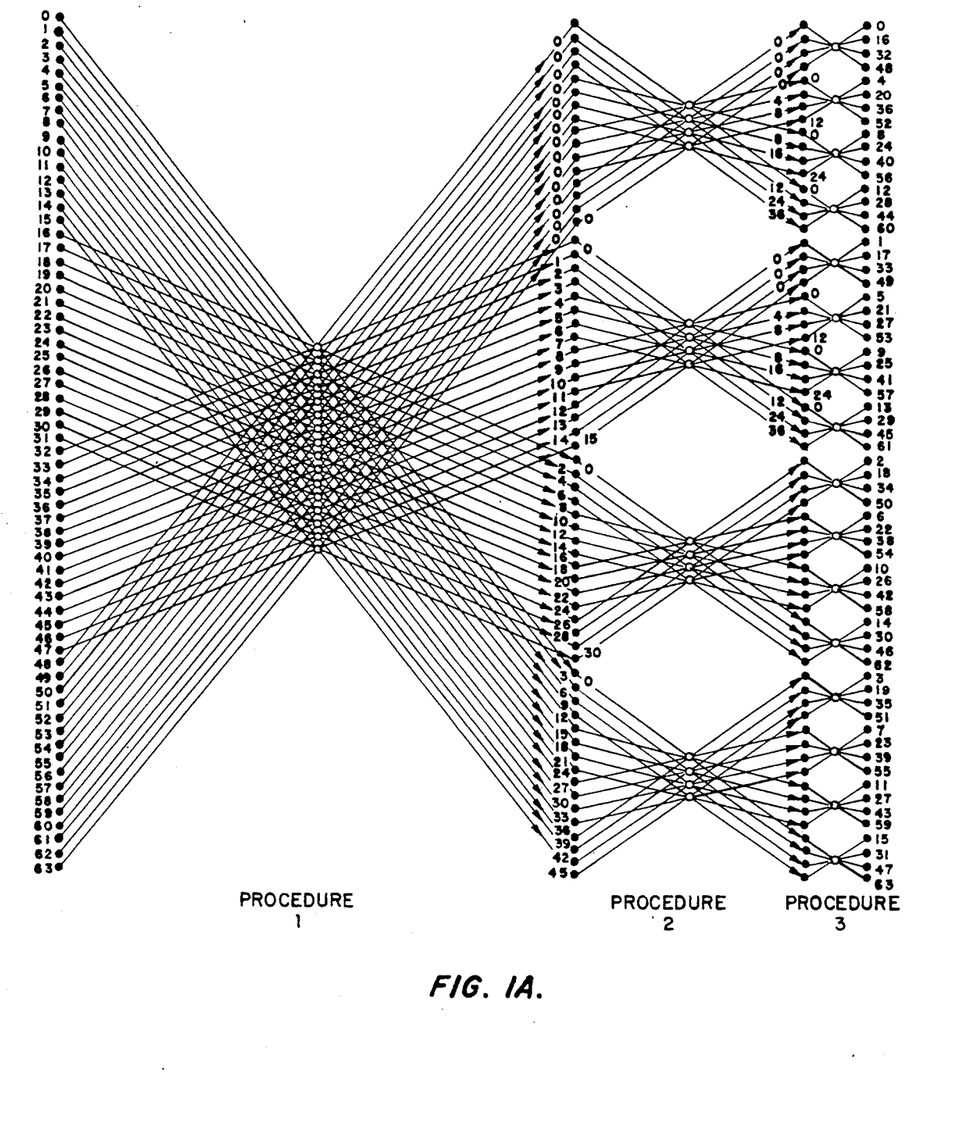
FIG. 1A illustrates the transformation of a 64 element array using a radix-4 fast Fourier transform.

FIG. 1A is the flow diagram for performing a radix-4 fast Fourier transform, using the decimation in frequency transform methodology, on a 64 element array of complex quantities. The numbers 0-63 associated with the left hand column refer to the ordering of the array elements. The numbers 0-63 associated with the right hand column similarly designate the ordering of the transformed array elements relative to the initial ordering. The transformation of a 64 element array involves three processing procedures. Processing procedure 1 involves the combination of elements extending over the entire 64 element array. The processing procedure 2 involves the combination of array elements within each of 4 groups of 16 array elements. The processing procedure 3 involves the combination of elements in each of 16 groups of 4 array elements. As will be clear to those skilled in the art, the combination of array elements includes the use of the scaling constants and includes the combination of quantities from a plurality (4 for the radix-4 transformation) of array elements.

Figure 1B:
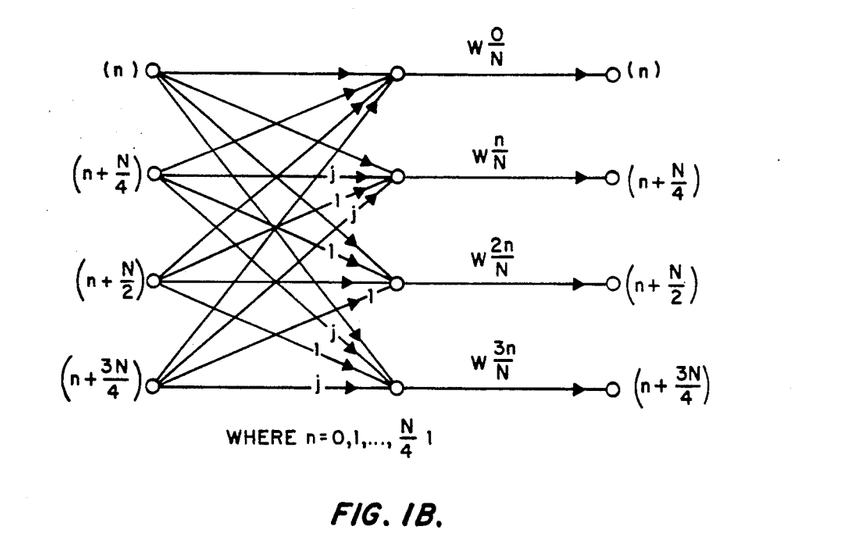
FIG. 1B illustrates the general relationship between the order of the original signal and the order of the transformed signals.

Referring to FIG. 1B, the relationship of the array elements actually combined in the each procedure of the fast Fourier transform is illustrated. For example, in procedure 1, illustrated in FIG. 1A, the transformed complex number q(0) will include components from p(0), p(16), p(32) and p(48). In FIG. 1B, $n=0,1,\ldots,(N/4-1)$ and $N=64$.

Figure 1C:
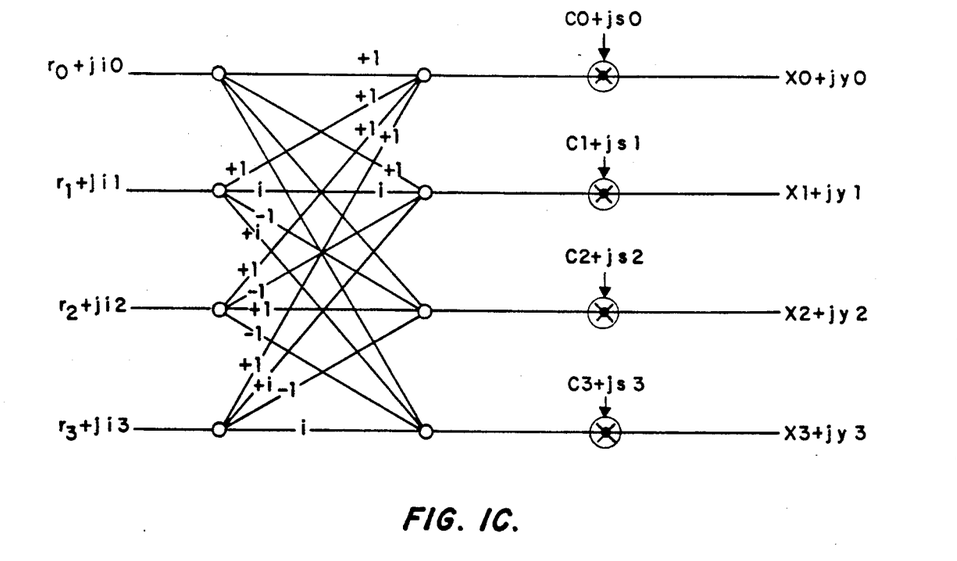
FIG. 1C illustrates the radix-4 fast Fourier transformation performed by a digital signal processing unit.

Referring to FIG. 1C, the effect of the operation of the digital signal processing apparatus on four complex variables and the four complex scaling factors is illustrated. FIG. 1C can best be understood in the following manner.

The Input Variables are:
$rZ+jiZ$; where $Z=0-3$.
The Scaling Factors are:
$cZ+jsZ$; where $Z=0-3$.
The Intermediate Variables are:
$aZ+jyZ$; where $Z=0-3$ or;

$$aZ + jyZ; \text{ where } Z = 0\text{-}3 \text{ or};$$

$$a0 + jb0 = [(r0 + r2) + (r1 + r3)] + j[(i0 + i2) + (i1 + i3)]$$

$$a1 + jb1 = [(r0 - r2) + (i1 - i3)] + j[(i0 - i2) - (r1 - r3)]$$

$$a2 + jb2 = [(r0 + r2) + (r1 + r3)] + j[(i0 + i2) - (i1 + i3)]$$

$$a3 + jb3 = [(r0 - r2) - (i1 - i3)] + j[(i0 - i2) + (r1 - r3)].$$

$a1+jb1=[(r0-r2+(i1-i3)]+j[(i0-i2)-(r1-r3)]$
$a2+jb2=[(r0+r2)+(r1+r3)]+j[(10+i2)-(i1+i3)]$
$a3+jb3=[(r0-r2)-(i1-i3)]+j[(i0-i2)+(r1-r3)].$

The Output Variables are:

$$xZ + jyZ; \text{ where } Z = 0\text{-}3 \text{ or}$$

$$x0 + jy0 = (a0 + jb0) * (c0 + js0)$$

$$x1 + jy1 = (a1 + jb1) * (c1 + js1)$$

$$x2 + jy2 = (a2 + jb2) * (c2 + js2)$$

$$x3 + jy3 = (a3 + jb3) * (c2 + js3)$$

In these equations, $j=(-1)^{\frac{1}{2}}$ and * denotes complex multiplication. The foregoing equations describe the processing capability of the digital signal processing apparatus. To perform the radix-4 fast Fourier transform, the values $c0=1$ and $s0=0$ must be set.

Figure 2:
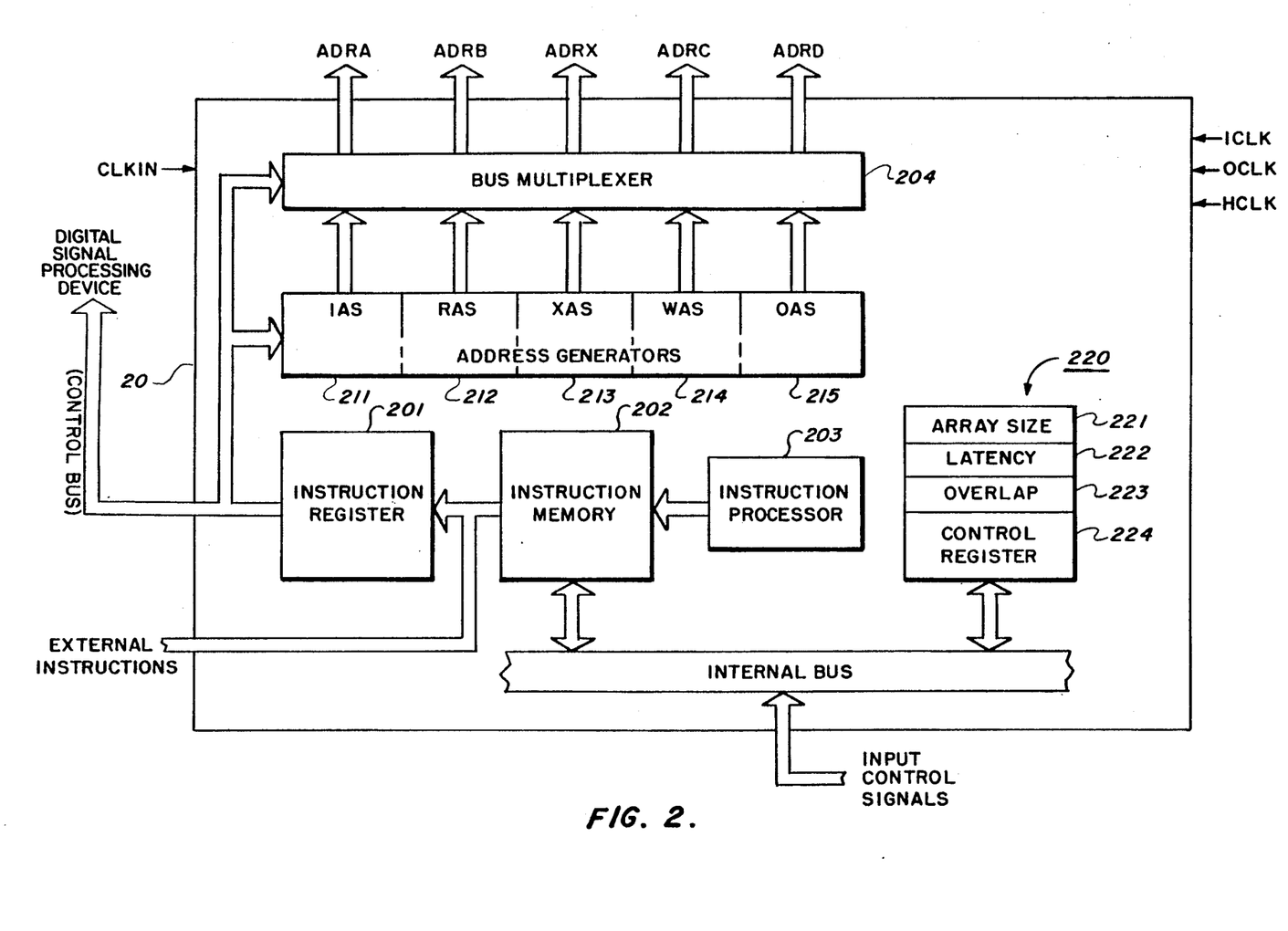
FIG. 2 is a functional block diagram of the apparatus for controlling the digital signal processing device.

Referring now to FIG. 2, the functional block diagram of the digital signal processing device control apparatus 20 of the present invention is shown. The control apparatus 20 includes an instruction processor 203 that controls the execution of instructions stored in instruction memory 202. In the preferred embodiment, the instruction memory can store 32 words. Under control of the instruction processor 203, an instruction from memory register 202 is placed in instruction register 201. The instruction register 201 applies programmable output signals (i.e., control signals) to the associated digital signal processing device and to associated memory apparatuses. The instruction register 201 provides control signals to the address generators, including input address sequencer (IAS) 211, a read address sequencer (RAS) 212, an auxiliary address sequencer (XAS) 213, a write address sequencer (WAS) 214 and an output address sequencer (OAS) 215. Control signals from the instruction register 201 to a bus multiplexer 204 control the application of the output of the five address generators 211-215 to one of five selected (i.e., by the control signals) memory units ADRA, ADRB, ADRX, ADRC and ADRD. The control apparatus 20 has a plurality of registers 220 that contain data required for the processing of members of the array. Register 221 stores the value describing the array size; register 222 stores information describing the latency of signals within the associated digital signal processor, and also in the associated (e.g., memory) apparatus; register 223 contains values describing the number of signal array members that are included as members of two arrays, i.e. the overlap, for purposes of processing the arrays; and control registers 224 stores information permitting additional flexibility in the digital signal processing. The control apparatus 20 can have an external instruction directly entered into the instruction register 201. Input control signals can be used to initialize (boot) the control apparatus 20, can load instructions into the instruction memory 202, and can load parameters into the register bank 220. The control apparatus 20 receives system clock signals, CLKIN signals, and can receive clock signals related to the signal arrays being entered into the signal processing system (ICLK signals), clock signals related to the apparatus receiving the processed signal arrays (OCLK signals), and clock signals related to initialization of the control apparatus 20 (HCLK signals).

Figure 3:
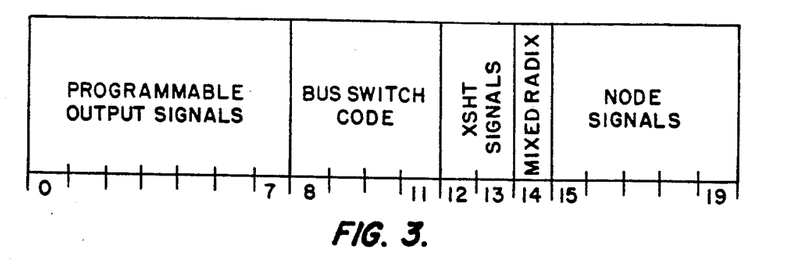
FIG. 3 illustrates the format for the control apparatus instruction.

Referring to FIG. 3, the instruction format of the preferred embodiment is shown. The instructions include 20 bit positions. The bit positions 0-7 have the programmable output signals stored therein. These output signals are used to control the associated digital signal processing device and other apparatus associated with the control apparatus. Bit positions 8-11 control the configuration of the bus multiplexer 204, thereby determining to which memory unit the signals from each address generator are applied. The bit positions 12-13 provide a scaling constant for the groups of address signals, that address the auxiliary memory, the ADRX signals. The data groups in this memory are the weighting factors sued in processing operations. The scaling factors can permit one group of data for different sized arrays. The bit position 14 determines a parameter of the processing algorithm. In the preferred embodiment, this parameter denotes the use of a mixed radix operation in a fast Fourier transform. Bit positions 15-19 define the type of addressing to be performed on the signals array, i.e., controls the sequences employed by the address generators 211-215.

Figure 4A:
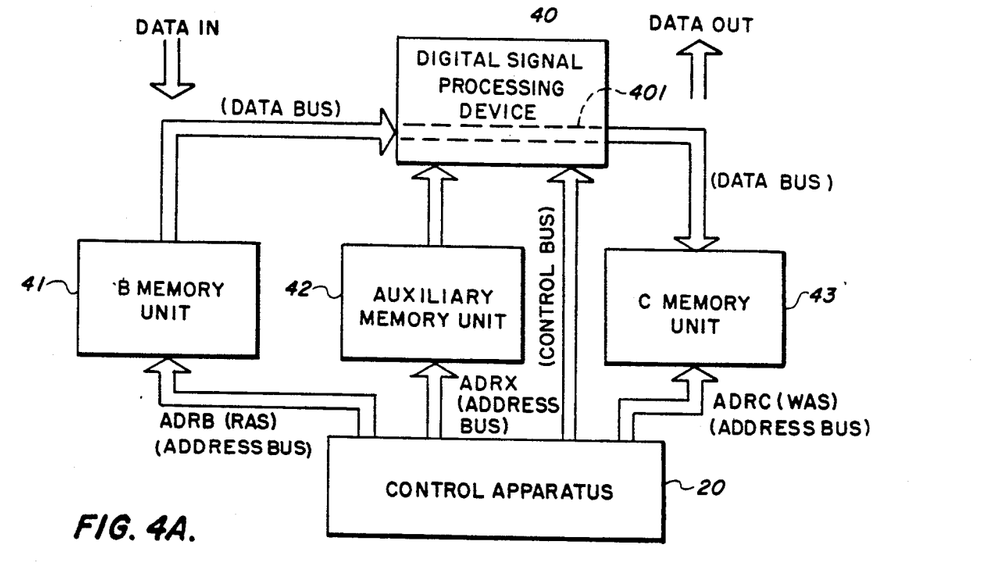
FIG. 4A and FIG. 4B illustrate system configurations for performing recursive processing functions in which associated memories have reallocated functions.

Referring next to FIG. 4A, the configuration of the system for the recursive execution of a digital signal processing algorithm is shown. The signal array to be processed is entered into memory unit B 41, i.e., the DATA IN signals are applied to memory unit B under control of the control apparatus 20. The signal array, once stored in memory unit B 41, is thereafter applied to the digital signal processing device 40 in response to address signals ADRB provided by the RAS address sequencer 212. Signal groups from the memory unit X 42 are simultaneously applied to the digital signal processing device 40 under control of the ADRX signals from the XAS address generator 213 of the control apparatus 20. The signals stored in the memory unit X 42 are the weighting factors (typically referred to as twiddle factors in reference to fast Fourier transform algorithms) used in executing fast Fourier transform procedures. The configuration of the digital signal processing device 40 is determined by control signals (Programmable Output Signals) from the control apparatus 20. The processed signals from the digital signal processing device 40 are applied to memory unit C 43 under control of the ADRC signals from the WAS write address generator 214 of the control apparatus 20. Control signals from the control apparatus 20 are applied to the digital signal processing device 40 for controlling the implementation of the processing procedures. The bus 401 of the digital signal processing unit 40 controllably couples the input ports of the digital signal processing device 40 to the output ports in the preferred embodiment.

Figure 4B:
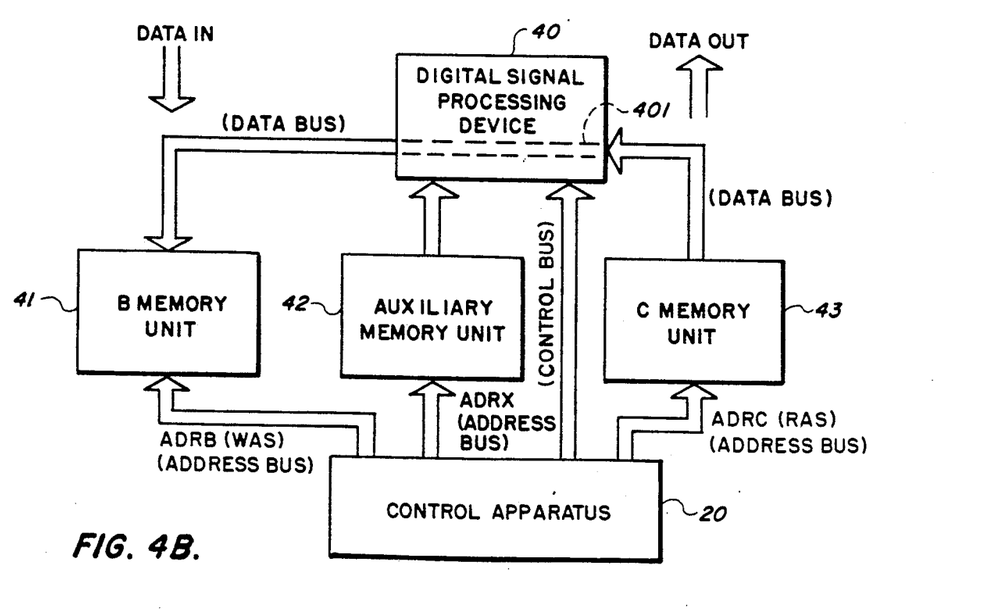

Referring to FIG. 4B, the configuration of the system for recursive digital signal processing is illustrated. The system is similar to FIG. 4A except that the array signals being applied to the digital signal processing device 40 are stored in the memory unit C 43, e.g., after being processed by the configuration shown in FIG. 4A. The (intermediate) array signals are applied to an input port of the digital signal processing device 40, which functions as an output port in the operation described in FIG. 4A, under control of the ADRC address signals generated by the RAS signal generator 212 of the control apparatus 20. The output signals from the digital signal processing device 40 are applied to an output port under control of the ADRB address signals generated by the WAS address generator 214 of the control apparatus 20. The ability to reverse the flow of the recursive processing of signal arrays is the result of the apparatus in the digital signal processing device to control the function of the normally designated input port and output port. At the end of the processing operation, the processed data signals are extracted from memory unit C 43.

Figure 4C:
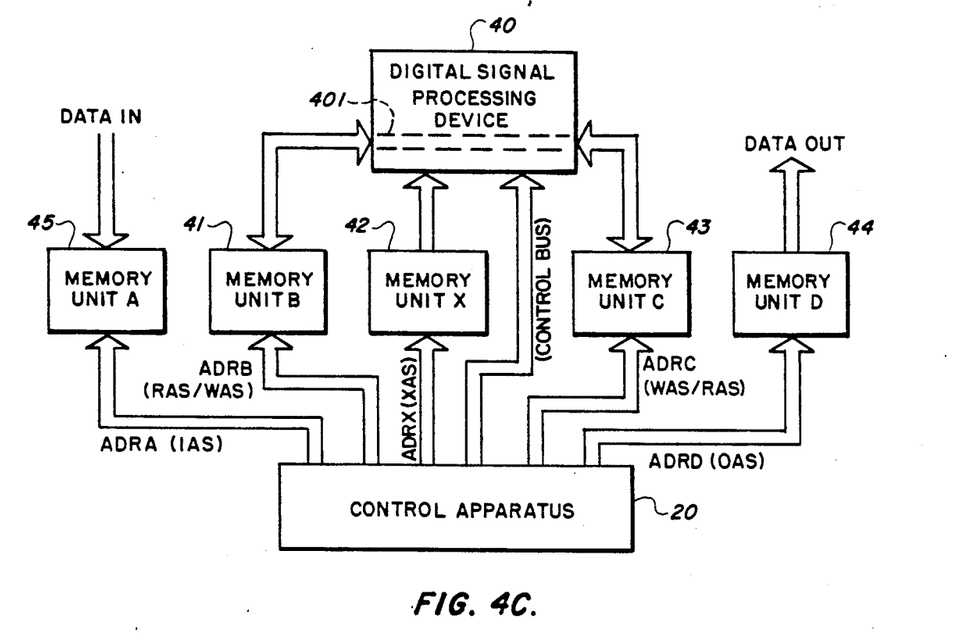
FIG. 4C; and 4D illustrate double buffered input/output system configurations for performing recursive processing functions in which associated memory units have reallocated functions.

Referring next to FIG. 4C, the system configurations of FIG. 4A and FIG. 4B have been consolidated and a memory unit A 45 and a memory unit D 44 added. The execution of a digital signal processing algorithm in a recursive manner is accomplished between the memory unit B, for which the ADRB address signals are provided alternatively by the RAS and the WAS address generator, and memory unit C, for which the ADRC address signals are provided by the WAS and the RAS address generator. The digital signals are exchanged between memory unit B 41 and memory unit C 43 and are processed by the digital signal processing device 40 under the control of the control apparatus 20 to implement a predetermined algorithm. The processing typically includes combining the signal groups in the memory units with signal groups from memory unit X 42, the data in memory unit X being determined by ADRX address signals from the XAS address generator 213. The additional memory unit A 45, in response to ADRA address signals provided by the IAS address generator 211, permits the entry of DATA IN signals even though a previously entered signal array is currently being processed. Similarly, the memory unit D 44, in response to ADRD address signals generated by the OAS address generator 215, permits a formerly processed signal array to be extracted from the system.

Figure 4D:
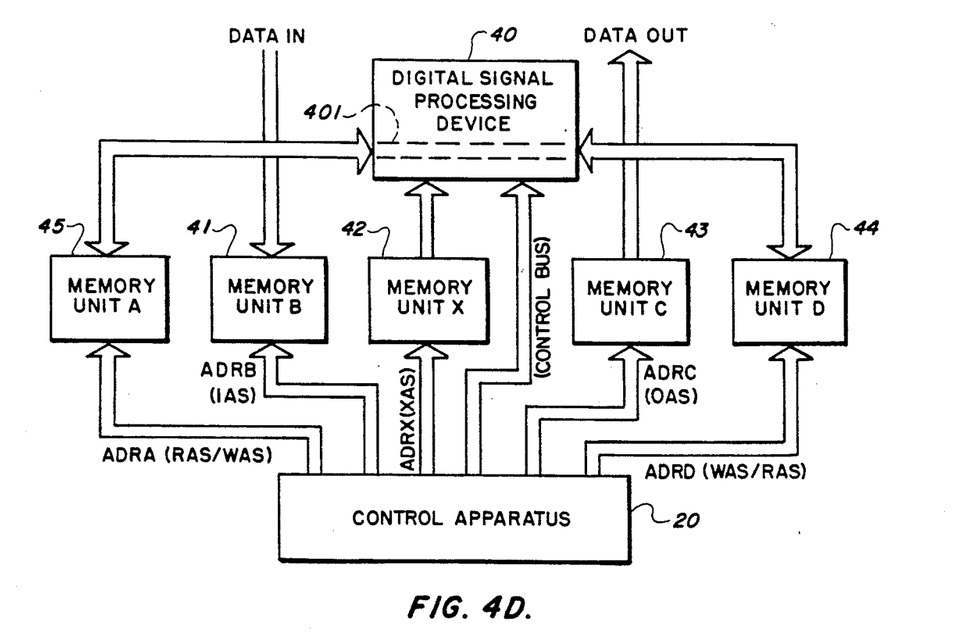

Referring next to FIG. 4D, when the digital signal processing system illustrated in FIG. 4C has completed the processing of the signal array stored in memory unit B 42 and memory unit C 43, the bus multiplexer 204 of control apparatus 20 causes the memory unit C 43 to receive ADRC address signals from the OAS address generator 215 and apply the DATA OUT signals an external apparatus. The memory unit B 41 receives ADRB address signals from the IAS address generator 211 and DATA IN signals of a signal array to be processed are entered in memory unit B 41. Simultaneously, the signal array now stored in memory unit A 41 (as a consequence of the system configuration of FIG. 4C) is now processed by transferring the signal array through the digital signal processing device 40 to memory unit D 44 in response to appropriately applied address signals from the RAS address generator 212 and the WAS address generator 214. The processing algorithm can therefore be executed in a recursive manner by repeatedly processing of the signal array alternatively stored in memory unit A 45 and memory unit D 44. The signal array that had been previously processed and stored in memory unit C 43 is now applied to an external apparatus through the application of OAS address signals to the memory unit C 43. The now empty and unused memory unit B 41 can now have the IAS address signals entered therein during the processing of the current array.

Figure 4E:
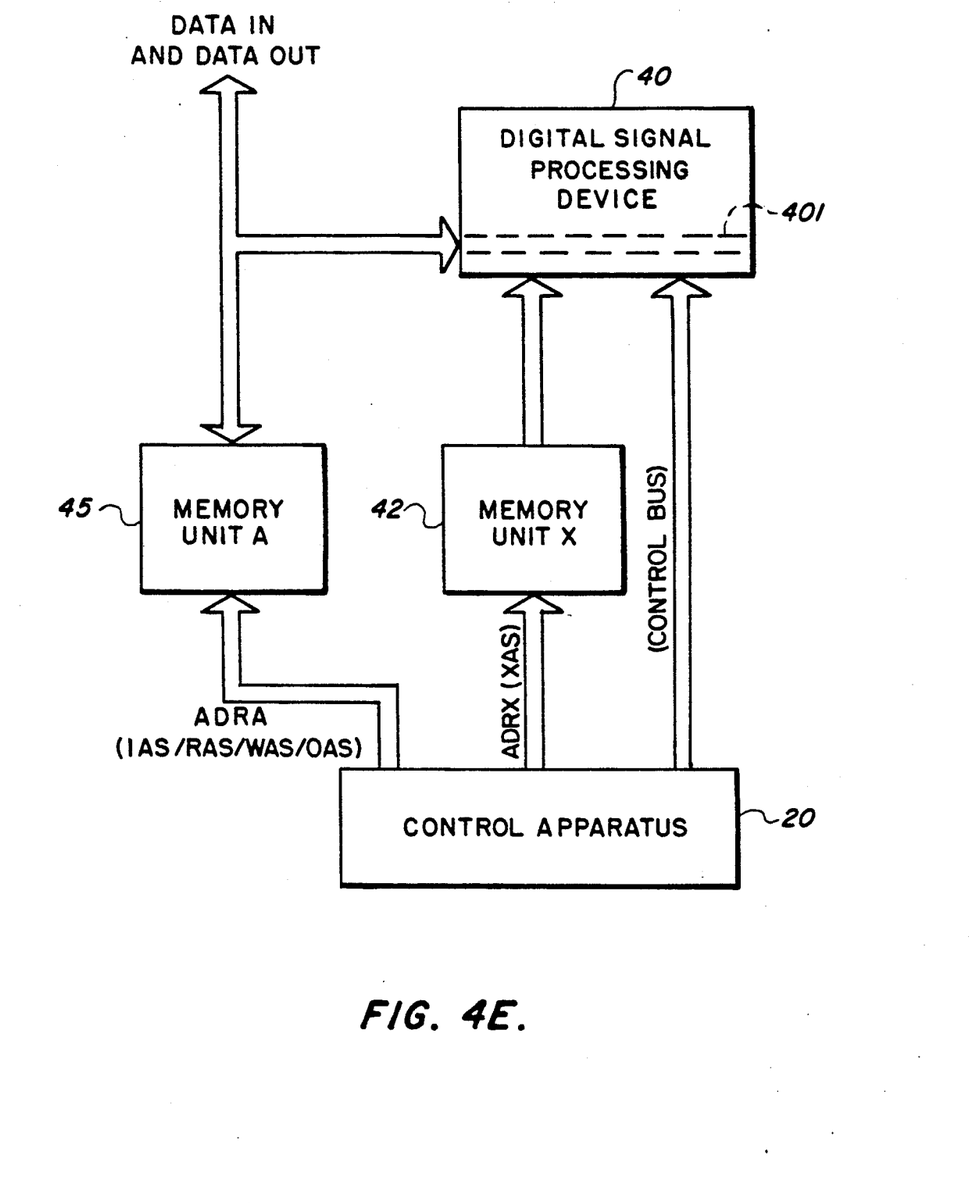
FIG. 4E illustrates a minimum configuration using the apparatus of the present invention.

Referring to FIG. 4E, the minimum system configuration for processing digital signal arrays according to the present invention is shown. In this configuration, the digital signal processing unit 40 has only memory unit A 45 associated therewith in addition to the memory unit X 42. Thus, the ADRA address signal must be provided by the IAS address generator 211 for entering data into the system, by the RAS address generator 212 for reading signal groups into the digital signal processing device 40, by the WAS address generator 214 for writing signal groups back into the memory unit A 45 and the OAS address generator 215 for applying processed signals to external apparatus. The presence of a single memory, in addition to the auxiliary memory). is made possible by the internal bus 401 of digital signal processing device 40, which permits processed signal groups to be applied to the input port and the bus multiplexer of control apparatus 20, which permits any address signals to be applied to the memory unit. It will be clear that the simplicity of the system is achieved at the cost of processing speed. Because the input and output signals of the digital signal processing device 40 pass through the same (input) port and cannot be simultaneously applied, the speed of the system will be compromised as compared to a system with at least one additional memory unit.

Figure 5A:
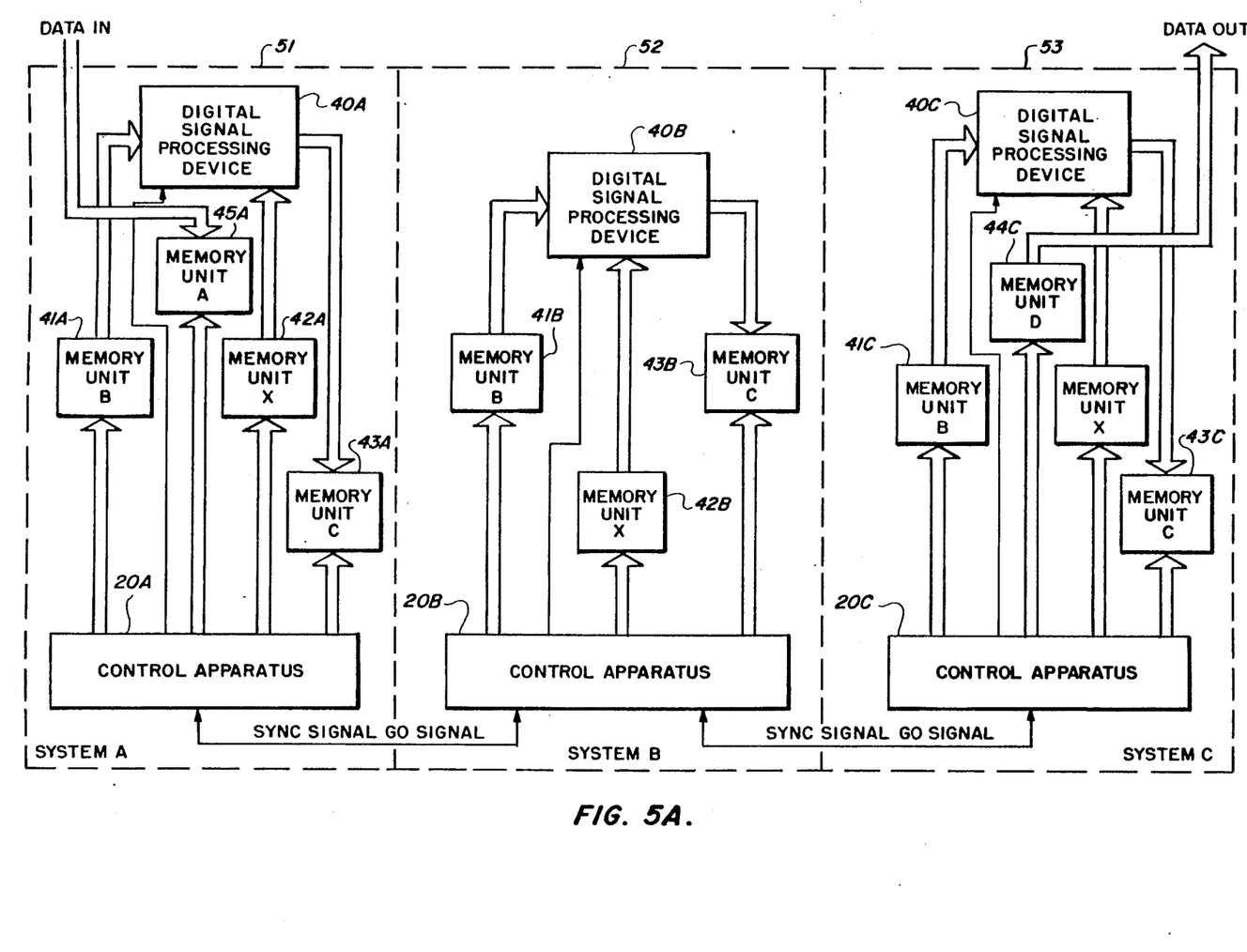
FIG. 5A and 5B/illustrate the operation of a plurality of sequential digital signal processing systems using the present invention.
Figure 5B:
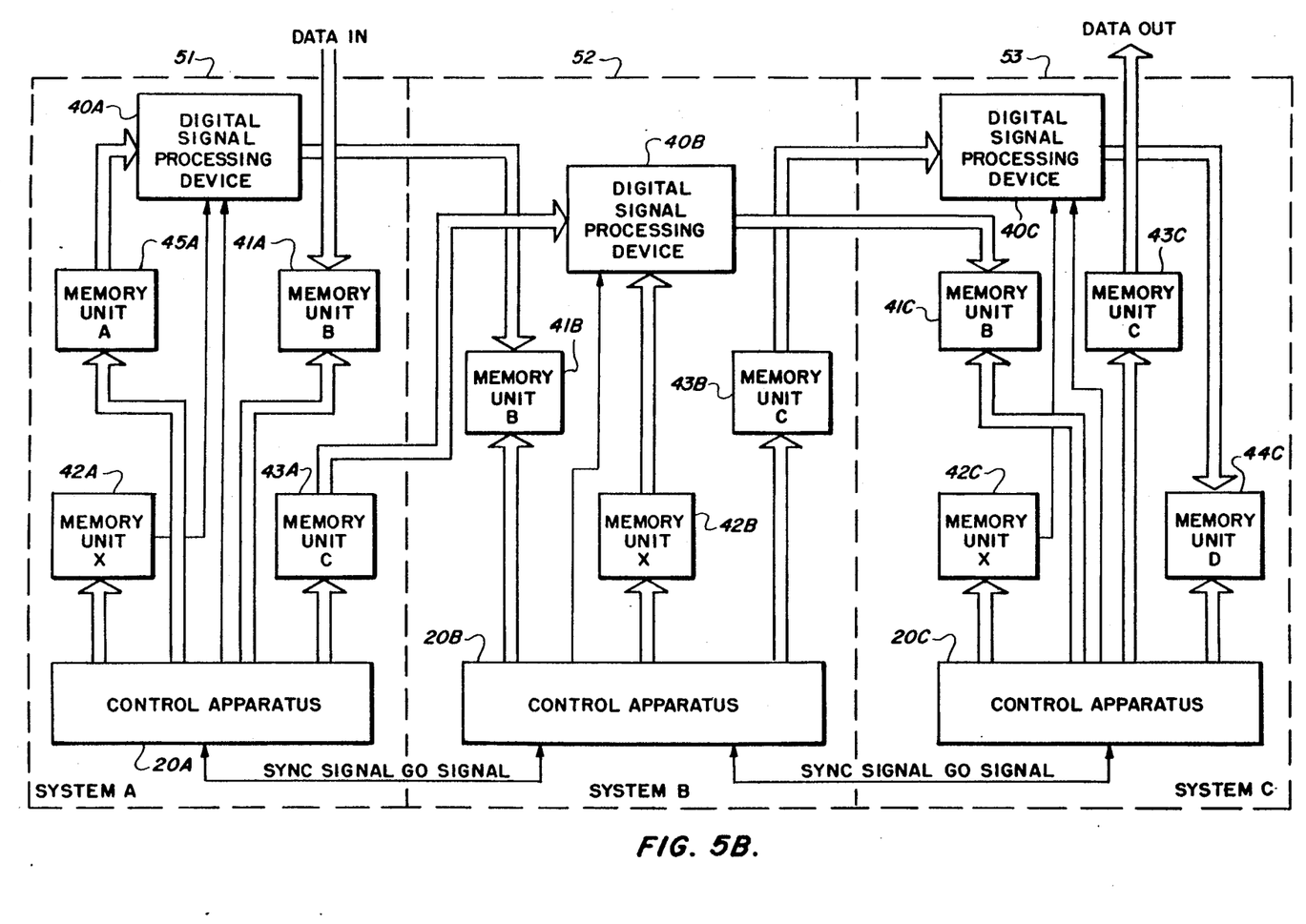

Referring next to FIG. 5A and 5B, the operation of a plurality of sequential or cascaded digital signal processing systems using the control apparatus 20 of the present invention is shown. In the illustrated embodiment, three systems, system A 51, system B 52, and system C 53 are used. However, it will be clear that any number of sequential or cascaded systems can be used. Digital signal processing systems A 51, B 52 and C 53 include digital, processing devices 40A, 40B and 40C;, a memory unit B's 41A, 41B and 41C; memory unit X's 42A, 42B, and 42C, memory unit C's 43A, 43B and 43C; and control apparatuses 20A, 20B and 20C; respectively. In addition, the first system in the sequence, system A 51, includes memory unit A 45A, while the final system in the sequence, system C 53, includes a memory unit D 44C. In FIG. 5A, the DATA IN signals of the signal array to be processed are entered in memory unit A 45A in response to IAS address signals from the control apparatus 20A. The previous signal array stored in memory unit B 41A, as addressed by RAS address signals, is processed and typically combined with weighting factors or other constants in memory unit X 42A, determined by the XAS address signals, in the digital signal processing device 40A and the resulting array is stored in memory unit C 43A at locations determined by the WAS address signals, the RAS, XAS and WAS signals being generated in control apparatus 20A. In system B, the previous, partially processed signal array stored in memory unit B 41B, as addressed by the RAS address signals, is processed and typically combined with weighting factors or other constants in memory unit X 42B, determined by the XAS address signals, in the digital signal processing device 40B and the resulting array is stored in memory unit C 43B, at locations determined by the WAS address signals the RAS, XAS and WAS address signals being generated in control apparatus 20B. In system C 53, the previous, partially processed signal array in memory unit B 41C, as addressed by RAS address signals , is processed and typically combined with weighting factors or other constants in memory unit X 42C, determined by the XAS address signals, in digital signal processing device 40C and the resulting array is stored in memory unit C 43C at locations determined by WAS address signals, the RAS, XAS and WAS address signals being generated in control apparatus 20C. In addition, the signal array stored in memory unit D 44C are removed from the system C 53 as DATA OUT signals under control of the OAS address signals from control apparatus 20C. After completion of the processing by the systems A 51, B 52 and C 53, the configuration of the sequential systems is changed as shown in FIG. 5B. In system A 51, the DATA IN signals are stored in memory unit B 41A at locations determined by IAS address signals from control apparatus 20A, memory unit B 41A being available after completion of the processing of the array previously stored therein. The signal array in memory unit A 45A is applied to the digital signal processing device 40A in response to RAS address signals from control apparatus 20A. The digital signal processing unit 40A processes the applied signal array in response to control signals from control apparatus 20A. The processing including use of signal groups in memory unit X 42A provided by XAS address signals from the control apparatus 20A in response to pres elected instructions. The processed signal array is stored in memory unit B 41B at locations determined by the WAS address signals generated by control apparatus 20B. The signal array stored in memory unit C 43A is applied to digital signal processing unit 40B in response to RAS address signals generated in control apparatus 20A. The applied signal array is processed in digital signal processing device 40B in response to control signals from control apparatus 20B. The processing including use of signal groups in memory unit X 42B that are provided in response to XAS address generated in apparatus 20B. The processed signal array is applied to memory unit B to WAS address signals generated b -- apparatus 20C. The signal array stored in memory unit C 43B is applied to digital signal processing unit 40C in response to address signals generated in control apparatus 20B. The signal array is processed by digital signal processing unit 40C in response to control signals from control 20C. The processing including use of sign groups in memory unit X 42C that are provided in response to apparatus 20C XAS address signals. The processed signal array is stored in memory unit D 44C in response to WAS address signals from control apparatus 20C. The .signal array stored in memory unit C 43C is transferred from system C 53 in response to OAS address signals from control (BEGINNING OF PASS) signal are provided by control apparatuses A 20A, B and C 20C to synchronize signal transfer among the processing systems.

Figure 6A:
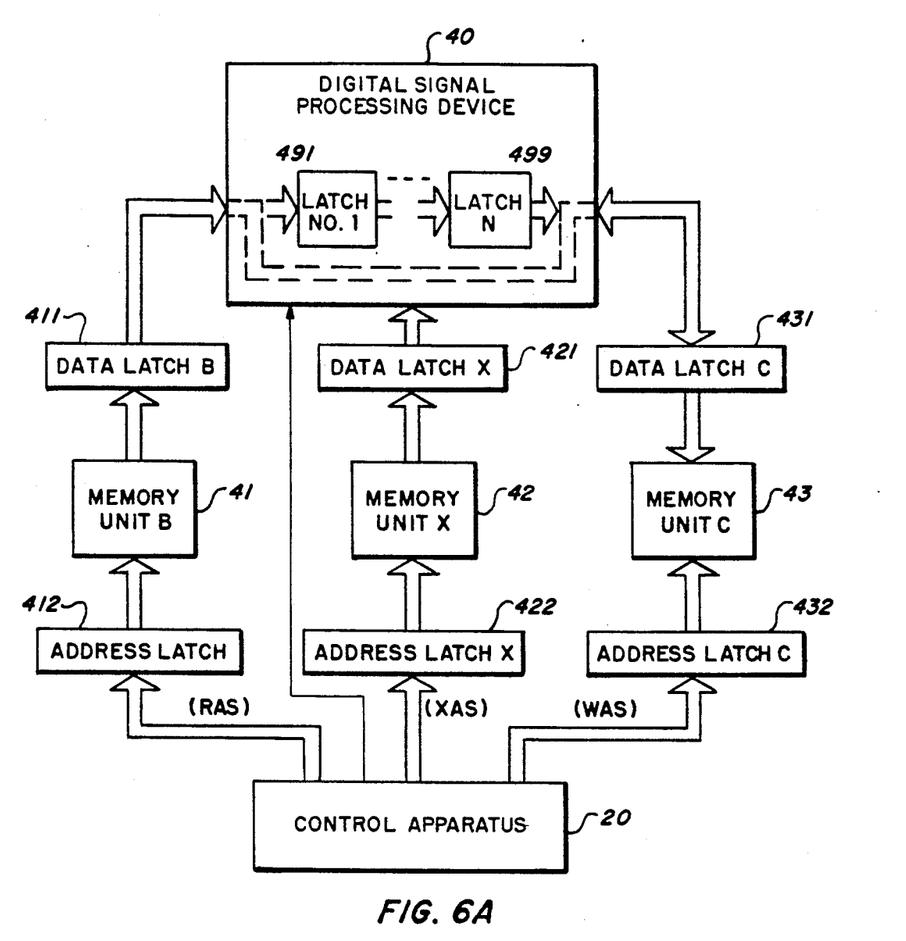
FIG. 6A and FIG. 6B illustrate the use of the latency register in the control apparatus of FIG. 2.

Referring next to FIG. 6A, the factors contributing to latency in digital signal processing of the present invention is illustrated. The RAS address signals, generated in the control apparatus 20 can be of such a frequency that, to insure accuracy of the addressing of memory unit B 41, an address latch 412 is inserted in the address signal path. Similarly, the XAS signals are applied to a address latch 422 before being applied to memory unit X 42. The data signals at the address identified by the RAS address signals stored in address circuit 412 are temporarily in data latch 411 prior to being digital signal processing device 40 and the signals stored in the location determined by the address signals stored in address latch 422 are -. stored in data latch 421 prior to being in the digital signal processing device 40 the data signals are applied to digital device 40, the digital signal processing device causes a delay in the propagation of signals. The delay is illustrated in FIG. 6A by latch #1 491 through latch #n 499. The latches 491-499 can be a representation of the various stages of a pipeline signal processing device. After the are processed by the digital signal processing device 40, the output signals are temporarily stored in data latch 431. The output signals are then stored in memory unit C 43 in a location determined by the WAS address signals stored in address latch 432, the WAS address signals having been by control apparatus 20. In this each latch circuit typically results in a system clock cycle delay of the signal therethrough. Similarly, the extraction of signals from a memory unit typically re one clock cycle. Thus, after RAS address signal generated in the control apparatus 20, the data signals applied to the digital signal processing unit 40 are delayed by two system clock cycles. „ the delay between the generation of the XAS adur signals and the application of the data identified by these address signals is also two s clock cycles. The digital signal processing unit device 40 also has a delay, which is typically determined by the operations that the device is required perform. In the preferred embodiment, the di signal processing device 40 is designed such that a system clock cycle delay separates the application the data signals to the input port and the cation of the processed data signals to the port of the digital signal processing device 40. The output signals are delayed one system clock prior to being applied to the memory unit 43. The WAS address signals are delayed one system clock cycle prior to being applied to memory unit C 43 to determine the memory location into which the data signals are stored.

Figure 6B:
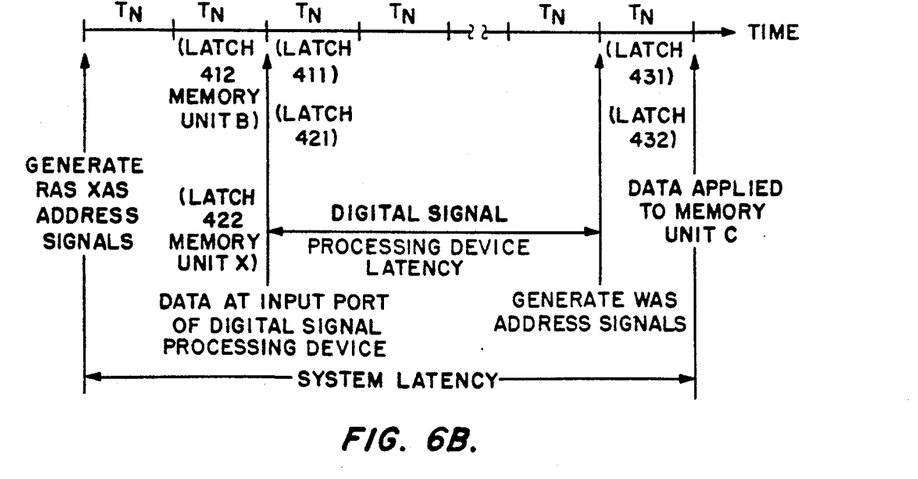

In FIG. 6B, the effects of the delays of the apparatus, resulting in latency, are shown. The system latency for the digital signal processing device 40 and associated apparatus begins when the instruction register 201 causes the RAS and the XAS signals to be generated and ends when the data signals are applied to the memory unit C43. The latency of the system includes the time periods for the data signals to be processed in the digital signal processing device 40. In the illustrated embodiment, the delay in providing the data signals from the memory unit B and from memory unit X are equal. While this is not a requirement, the equality of these delays is typically employed for design simplification. The system latency is used to ensure that the storage of the processed data signals is synchronized with the application of the unprocessed data signals to the digital signal processing device 40. The control apparatus 20 automatically compensates for these delays, permitting a user to enter appropriate configuration signals into a control register.

Figure 7:
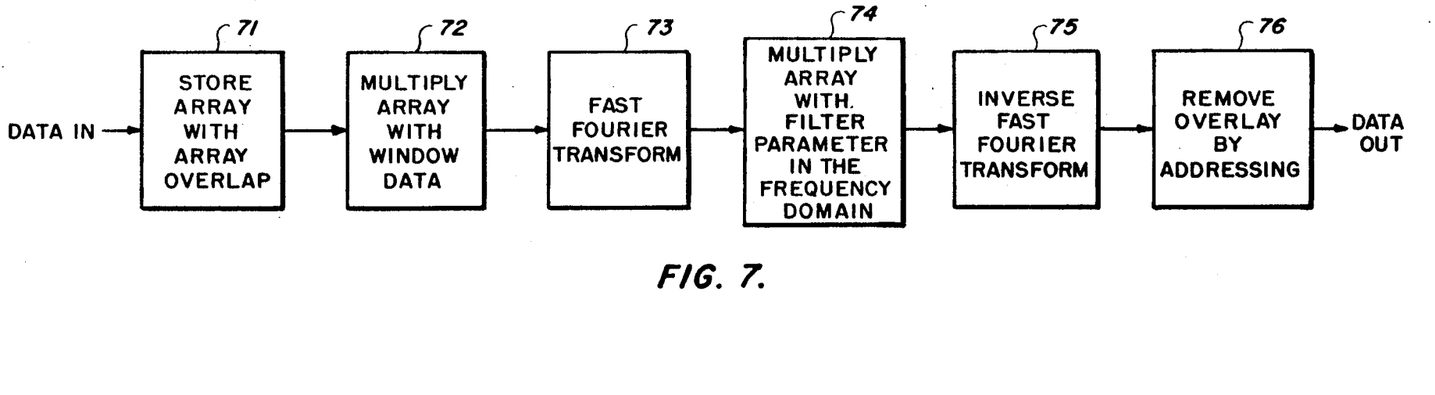
FIG. 7 is a flow diagram of the use of the present invention of digital signal filtering in the frequency domain.

Referring next to FIG. 7, the process of digital filtering in the frequency domain employing the digital signal processing system of the present invention is illustrated. In process 71, the DATA IN signals are stored so that an overlap of sequential data arrays is achieved. In step 72, window data is combined with the array data in a multiplication operation. Using stored weighting factors, a fast Fourier transform is performed to produce an array of signals in the frequency domain in step 73. In step 74, a stored frequency response of the filter is combined with the frequency domain array signals. Using the stored weighting factors, the inverse fast Fourier transform is performed on the signal array to transform the array into a time domain signal array in step 75. The signals of the array that were the result of the array overlap are deleted in step 76, resulting in the DATA OUT.

Figure 8:
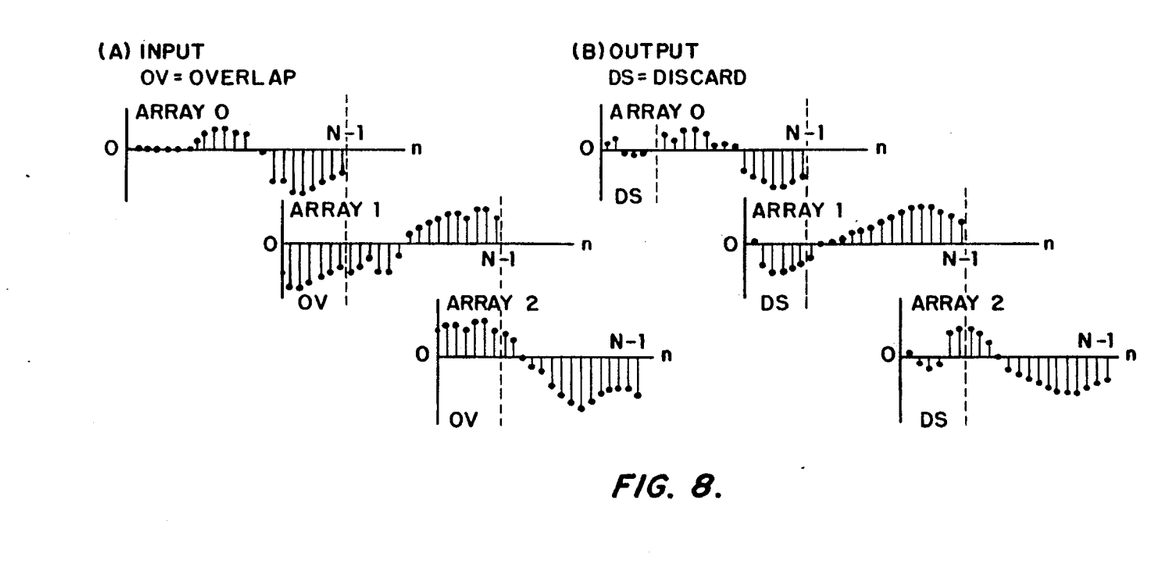
FIG. 8 illustrates the overlap between arrays and the signals discarded after processing the arrays.

In the process illustrated in FIG. 7 and in similar processes, the lengthy sequence is divided up into segments of data, referred herein to arrays of data. The arrays of data are constrained to overlap, as illustrated in FIG. 8, to minimize the effects of processing a long series of signals as a shorter series of signals. The portions of the arrays that overlap are discarded after processing and are not included among the DATA OUT signals.

Figure 9:
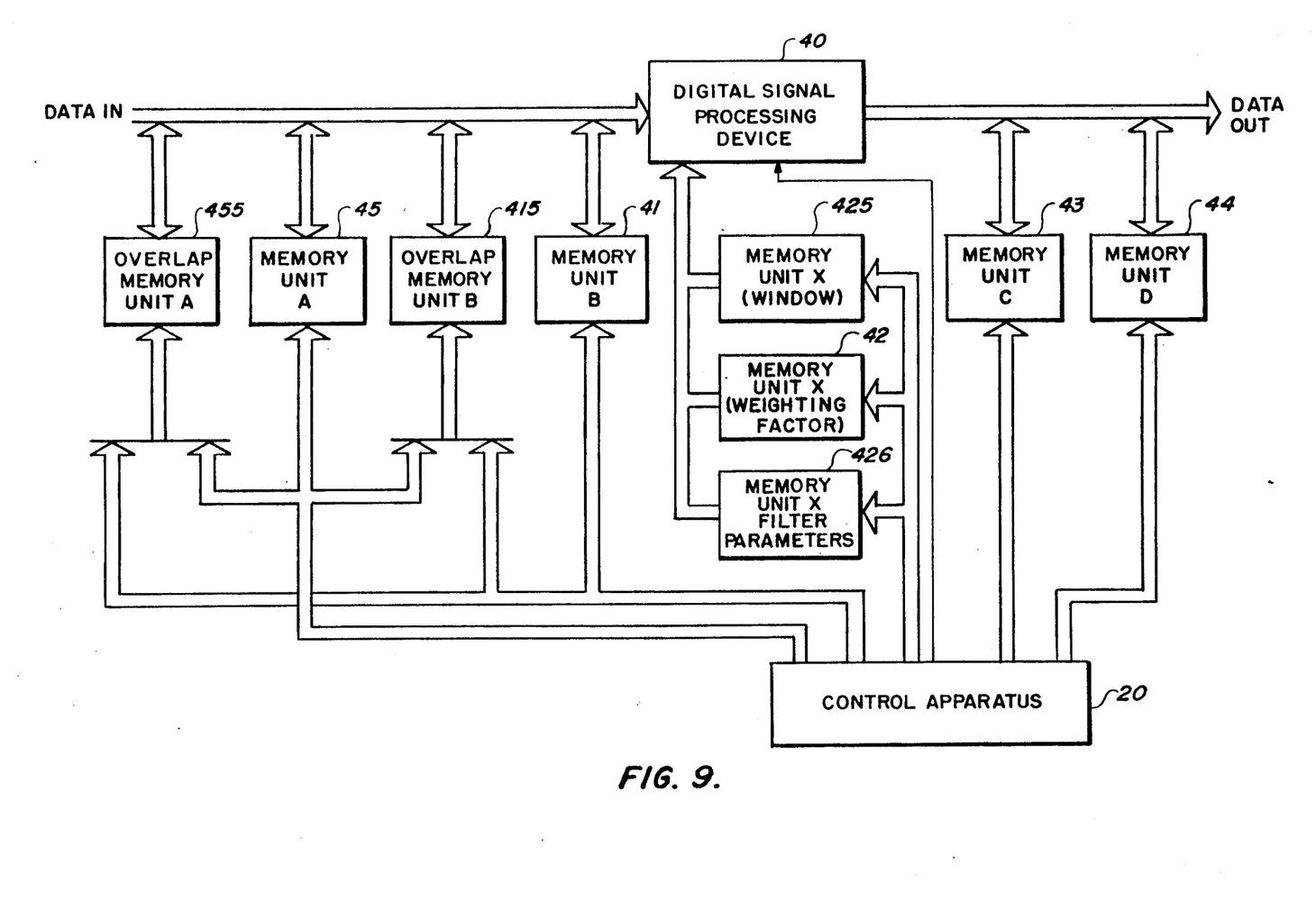
FIG. 9 illustrates a digital signal, processing system that uses the present invention and that can execute the process illustrated in FIG. 8.

Referring next to FIG. 9, the use of the apparatus of the present invention to execute, in a recursive manner, the procedure illustrated in FIG. 7 is shown. The digital signal processing device 40 performs the processing functions under the control of the control apparatus 20. As in the configuration illustrated in FIG. 4C and 4D, the recursive configuration includes memory unit, 45 and memory unit B 41 coupled to the input port of the digital signal processing device 40 with memory unit C 43 and memory unit D44 coupled to the output port of the digital signal processing device 40. In addition, an overlap memory unit A 455 is associated with memory unit A 45 and an overlap memory unit B 415 is associated with memory unit B41. Also, memory unit X (window) 425 and memory unit X (filter parameters) 426 have been added to provide extended sets of numerical values that are used during the processing of the array and filter data. The additional overlap memory unit A 455 and overlap memory unit B 415 provide storage for the signals that are used in the overlap computation. By appropriate addressing of the input memory unit arrays, the overlap signals can be combined with the next sequential array and processed therewith. Similarly, by appropriate addressing of the output signals, the overlap processed signals can be eliminated. The amount of the overlap is stored in the overlap register 223 of FIG. 2, which controls the addressing for the signal arrays with overlap signals and the elimination of the overlap in the processed signals.

2. Operation of the Preferred Embodiment

The present invention provides for flexible control of a digital signal processing device. In the preferred embodiment, the digital signal processing unit can be configured to perform a radix-4 fast Fourier transform on four applied complex signal groups, a radix-2 fast Fourier transform on two sets of two applied complex signal groups, a fast Fourier transform of N complex signal groups to provide 2N real signal groups, and a fast Fourier transform of N complex signal groups into N real signal groups. In addition, the digital signal processing device of the preferred embodiment can execute a mixed radix-4/radix-2 procedure and can perform a multiplicity of arithmetic and logical operations on applied complex signal groups.

The separation of the processing and control functions in the implementation of the digital processing apparatus permits flexibility in the resulting digital signal processing system. In this manner, the digital processing device used in the system can be redesigned to meet different or unforeseen processing procedures without disrupting the programs that control the operation of the control apparatus. Similarly, in the event of an unforeseen control requirement wherein the processing algorithm is unchanged, only the control apparatus need be redesigned. The address generators, IAS 211., RAS 212, XAS 213, WAS 214, and OAS 215, are implemented by sequencing apparatuses in the preferred embodiment. For fast Fourier transform operations, the only variable of significance is the signal group array size. Of course, the size of the signal group array determines the weighting factors used in the transformation. Because this quantity is known and is stored in a register in the present invention, the addressing sequences can be fixed (hardwired) in the control apparatus. For the processing of arrays of signals, the data groups to be processed have periodic addresses in the array, a characteristic that lends itself to the use of address sequencers to address the array. The periodicity and the size of the array are sufficient to specify the sequence for typical signal array processing. As is well known to those familiar with the processing of digital signal arrays, and especially processing according to the fast Fourier transform, the output signal group having the sequential position as the input signal group can correspond to a different address. This different address can be accommodated by a procedure, referred to as digit reversing, in which groups of logic signals representing the address can be reversed to provide the correct sequential address.

Referring again to FIG. 3, the bit position 14 of the control apparatus instruction format designates a mixed radix algorithm. In the fast Fourier transform algorithms, the radix-2 butterfly procedure operates on an array of $2^N$ members. The radix-4 butterfly procedure operates on an array of $4^M$ members. However, the radix-4 butterfly procedures require fewer computations (M) and are therefore the preferred procedures for fast Fourier transforms. Therefore, when the array is of such a size that the array can be decomposed into an even plurality of radix-4 arrays, the mixed radix algorithm allows the entire array to processed. First, the radix-2 procedure is used. Then each of the radix-4 arrays comprising the initial array are processed using the radix-4 procedures.

The flexibility imparted to the digital system processing system by incorporation of bus multiplexer 204 into the control apparatus 20 is illustrated in FIGS. 4A–4E and 5A–5B. The bus multiplexer 204 permits the function of the memory units to be changed in response to instructions placed in the control apparatus 20. Thus, for example, during the execution of a recursive algorithm, the configuration of the bus multiplexer 204 determines whether a memory unit is entering a signal array into the digital processing device or receiving signals from the digital signal processing device. In the cascaded or sequential coupling of systems, the address signals control the entry from and to adjacent systems. In the preferred embodiment, the system clock signal, CLKIN, has associated therewith a periodic synchronization signal that can be used to synchronize operation between the plurality of digital signal processing systems. The CLKIN signal also has GO control signal that is used to produce the END OF PASS and BEGINNING OF PASS control signals. As suggested by the name the BEGINNING OF PASS indicates the beginning of the processing of a signal array by the associated digital signal processing device and is used as a SYNC signal. Similarly, the END OF PASS signal designates the completion of the processing of a signal array by the associated digital signal processing device 40. By applying a single GO control signal to the plurality of digital signal processing systems, the control apparatuses of the associated digital signal processing system can initiate activity in a timely manner.

The use of the present invention in a recursive mode operation is illustrated in FIGS. 4A–4E and in a cascaded or sequential mode of operation is illustrated in FIGS. 5A and 5B. It will be clear that these two modes of operation are not exclusive, but can be combined in appropriate situations. Any system in the sequence can perform a plurality of operations prior to transferring the signal groups to the next sequential system.

The foregoing description is included to illustrate the operation of the preferred embodiment of the invention and is not meant to limit the scope of the invention. From the foregoing description, many variations will be apparent to those skilled in the art that would yet be encompassed by the spirit and scope of the invention.

What is claimed is:

1. An apparatus for controlling a digital signal processing device that is capable of performing a fast-Fourier transform (FFT) on a signal array and a plurality of memory units associated with the digital signal processing device where at least one of the memory units is capable of storing a signal array, comprising:
    first means for determining which of a plurality of FFT address sequences should be generated and applied to the plurality of memory units in order for the digital signal processing device to achieve a digital signal processing function, said first means including means for processing a plurality of instructions, a first memory for storing said plurality of instructions, and a second memory for storing a delay associated with transferring information between the digital signal processing device and the memory units and with the processing of a signal array by the digital signal processing device, wherein the contents of said second memory can be altered to accommodate configurations of the digital signal processing device and the plurality of memory units that have a different delay; and
    second means, responsive to said first means, for generating the addresses of locations in the memory units that are necessary to accomplish the digital signal processing function and applying the addresses to the memory units.

2. An apparatus, as claimed in claim 1, wherein:
    each instruction, when processed by said first means, results in more than one element of a signal array being processed by the digital signal processing device.

3. An apparatus, as claimed in claim 1, wherein:
    each instruction, when processed by said first means, results in all of the elements of a signal array being processed by the digital signal processing device.

4. An apparatus, as claimed in claim 1, wherein:
    said means for processing includes a vector processor.

5. An apparatus, as claimed in claim 1, wherein:
    said plurality of instructions remaining in the same locations in said first memory during the processing of a signal array.

6. An apparatus, as claimed in claim 1, wherein:

said first means includes means for bypassing said first memory to provide an instruction that is external to said first memory.

7. An apparatus, as claimed in claim 1, wherein: said first means includes a third memory for storing the amount that adjacent signal arrays to be processed by the digital signal processing device overlap, wherein the contents of said third memory can be altered to accommodate digital signal processing applications that require different amounts of signal array overlap.

8. An apparatus, as claimed in claim 7, wherein: the amount of overlap allows said first means to generate the addresses necessary to discard the portions of the signal array output by the digital signal processing device that overlap.

9. An apparatus, as claimed in claim 1, wherein: said first means includes a fourth memory for storing the size of the signal array to be processed by the digital signal processing device, wherein the contents of said fourth memory can be altered to accommodate digital signal processing applications that require signal arrays of different sizes to be processed.

10. An apparatus, as claimed in claim 1, wherein: said first means includes means for coordinating the operation of the apparatus with the operation of another apparatus that is associated with another digital signal processing device and associated memory units.

11. An apparatus, as claimed in claim 1, wherein: at least one of the instructions capable of being processed by said means for processing includes a FFT of N complex-points into two separate N real-point FFTs.

12. An apparatus, as claimed in claim 1, wherein: at least one of said plurality of instructions capable of being processed by said means for processing includes one of the following functions: a mixed radix and a FFT of N complex-points into a FFT of 2N real-points.

13. An apparatus, as claimed in claim 1, wherein: said second means includes a plurality of address generators, wherein each of said plurality of address generators produces the addresses for one of the memory units.

14. An apparatus, as claimed in claim 13, wherein: said second means includes a multiplexer for use in selecting which memory unit each of said plurality of address generators provides with addresses.

15. An apparatus, as claimed in claim 1 wherein: said second means includes a first address generator for producing the addresses of the memory unit that receives a signal array to be processed by the digital signal processing device in the future, a second address generator for simultaneously producing the addresses for the memory unit that provides the digital signal processing device with a signal array for processing, a third address generator for simultaneously producing the addresses of the memory unit that receives the signal array processed by the digital signal processing device, and a fourth address generator for simultaneously producing the addresses for the memory unit that outputs a signal array previously processed by the digital signal processing device.

16. An apparatus, as claimed in claim 1, wherein: said second means includes hardwired means for use in generating the addresses.

17. An apparatus, as claimed in claim 1, wherein: said second means includes a third means for selecting which memory units receive the addresses generated by said second means.

18. An apparatus, as claimed in claim 1, wherein: said first means and said second means are fabricated on a single semiconductor substrate.

19. A method for adaptively controlling a digital signal processing device that is capable of performing a fast-Fourier transform (FFT) digital signal processing function on a signal array and a plurality of memory units, wherein at least one of the plurality of memory units is capable of exchanging signal array information with the digital signal processing device, comprising:
providing a controller for determining which of a plurality of address sequences should be generated and applied to the plurality of memory units;
combining a plurality of digital signal processing instructions to produce a first program;
transmitting said program to said controller;
storing said program in said controller;
determining the delay associated with both transferring information between one of the memory units and the digital signal processing device and with the digital signal processing device in processing a signal array;
transmitting the delay to said controller;
storing the delaying said controller;
executing said program, wherein said controller produces the address sequences required by said plurality of digital signal processing instructions and the delay;
performing at least one of the following actions:
reconfiguring said digital signal processing device and
said plurality of memory units into a configuration having a different delay; and
combining a plurality of digital signal processing instructions to produce a second program
redetermining, according to said step of performing, said different delay;
transmitting, according to said step of performing, at least one of said different delay and said second program to said controller and storing same in said controller; and
executing one of the following: said first program and said second program, wherein said controller produces the address sequences required by the plurality of digital signal processing instructions and the delay.

20. A method, as claimed in claim 19, further including:
determining the amount of overlap of adjacent signal arrays to be processed by the digital signal processing device;
transmitting the overlap to said controller;
storing the overlap in said controller; and
repeating said steps of determining the amount of overlap, transmitting the overlap, and storing the overlap when the overlap changes.

* * * * *